(12) United States Patent
Kumar et al.

(10) Patent No.: US 11,756,296 B2
(45) Date of Patent: Sep. 12, 2023

(54) DEVICE ANTI-SURVEILLANCE SYSTEM

(71) Applicant: Dell Products L.P., Round Rock, TX (US)

(72) Inventors: Dhilip S. Kumar, Bangalore (IN); Jaganathan Subramanian, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 17/225,236

(22) Filed: Apr. 8, 2021

(65) Prior Publication Data
US 2022/0327315 A1 Oct. 13, 2022

(51) Int. Cl.
| | |
|---|---|
| G06V 20/40 | (2022.01) |
| G06N 3/08 | (2023.01) |
| G06N 3/04 | (2023.01) |
| G06T 7/70 | (2017.01) |
| G06V 10/22 | (2022.01) |
| G06F 18/21 | (2023.01) |
| G06F 18/24 | (2023.01) |
| H04N 23/60 | (2023.01) |
| G06V 10/44 | (2022.01) |

(Continued)

(52) U.S. Cl.
CPC .............. *G06V 20/41* (2022.01); *G06F 18/21* (2023.01); *G06F 18/24* (2023.01); *G06N 3/04* (2013.01); *G06N 3/08* (2013.01); *G06T 7/70* (2017.01); *G06V 10/22* (2022.01); *G06V 10/454* (2022.01); *G06V 30/18057* (2022.01); *G06V 30/19127* (2022.01); *H04N 23/60* (2023.01); *G06T 2207/10016* (2013.01); *G08B 5/22* (2013.01)

(58) Field of Classification Search
CPC ........ G06V 20/41; G06V 20/20; G06V 10/22; G06V 10/454; G06V 10/25; G06V 10/82; G06V 30/18057; G06V 30/19127; G06F 18/21; G06F 18/24; G06N 3/04; G06N 3/08; G06N 3/044; G06N 3/045; G06T 7/70; G06T 2207/10016; H04N 23/60; G08B 5/22
See application file for complete search history.

(56) References Cited

U.S. PATENT DOCUMENTS

| | | | |
|---|---|---|---|
| 6,665,079 B1 * | 12/2003 | Tocci ........................ | G02B 5/12 356/614 |
| 10,713,794 B1 * | 7/2020 | He ........................ | G06V 10/764 |

(Continued)

OTHER PUBLICATIONS

G. Ning, "Recurrent YOLO for Object Tracking," guanghan.info/projects/ROLO/, Accessed Mar. 30, 3021, 4 pages.

(Continued)

*Primary Examiner* — John B Strege
(74) *Attorney, Agent, or Firm* — Ryan, Mason & Lewis, LLP

(57) ABSTRACT

A method comprises receiving one or more inputs captured by a camera of a device, and determining, using one or more machine learning models, whether the one or more inputs depict at least one object configured to capture a visual representation of a screen of the device. A recommendation is generated responsive to an affirmative determination, the recommendation comprising at least one action to prevent the capture of the visual representation of the screen of the device.

20 Claims, 11 Drawing Sheets

(51) Int. Cl.
*G06V 30/18* (2022.01)
*G06V 30/19* (2022.01)
*G08B 5/22* (2006.01)

(56) References Cited

U.S. PATENT DOCUMENTS

| | | | |
|---|---|---|---|
| 11,270,668 B1* | 3/2022 | Raynor | G06F 3/0346 |
| 2015/0341139 A1* | 11/2015 | Bradley | G06F 21/6209 |
| | | | 348/143 |
| 2018/0211115 A1* | 7/2018 | Klein | H04L 9/30 |
| 2021/0287387 A1* | 9/2021 | Deegan | G06T 7/10 |
| 2021/0297629 A1* | 9/2021 | Lemes da Silva | G06F 18/214 |
| 2021/0390215 A1* | 12/2021 | Sangle-Ferriere | G06F 21/84 |
| 2021/0407266 A1* | 12/2021 | Jarvis | G06N 3/02 |
| 2022/0270327 A1* | 8/2022 | Sivakumar | G06V 40/103 |

OTHER PUBLICATIONS

A. Sachan, "Zero to Hero: A Quick Guide to Object Tracking: MDNET, GOTURN, ROLO," https://cv-tricks.com/object-tracking/quick-guide-mdnet-goturn-rolo/, Accessed Mar. 30, 3021, 8 pages.
Github, "Guanghan / ROLO," https://github.com/Guanghan/ROLO, Accessed Mar. 30, 3021, 9 pages.

* cited by examiner

DEVICE ANTI-SURVEILLANCE SYSTEM

FIELD

The field relates generally to information processing systems, and more particularly to systems that prevent the capture of sensitive images from a screen of a device.

BACKGROUND

Device screens such as, for example, portable device screens like laptop, notebook computer and tablet screens, are often exposed to unauthorized users in the workplace, hotels, airports, coffee shops, parks and many other places. Data exposed on these screens may include confidential, personal or other types of sensitive data.

The functionality of cameras, such as cameras on smartphones, continues to improve, enabling users to capture high definition and accurate pictures of device screens with sensitive information from different distances without user knowledge. Such pictures may be shared with parties that can steal the user's sensitive information and use it for financial gain, such as in the case of identity or corporate theft.

SUMMARY

Illustrative embodiments provide techniques to prevent unauthorized parties from taking photographs of device screens displaying sensitive data.

In one embodiment, a method comprises receiving one or more inputs captured by a camera of a device, and determining, using one or more machine learning models, whether the one or more inputs depict at least one object configured to capture a visual representation of a screen of the device. A recommendation is generated responsive to an affirmative determination, the recommendation comprising at least one action to prevent the capture of the visual representation of the screen of the device.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Figure 1:
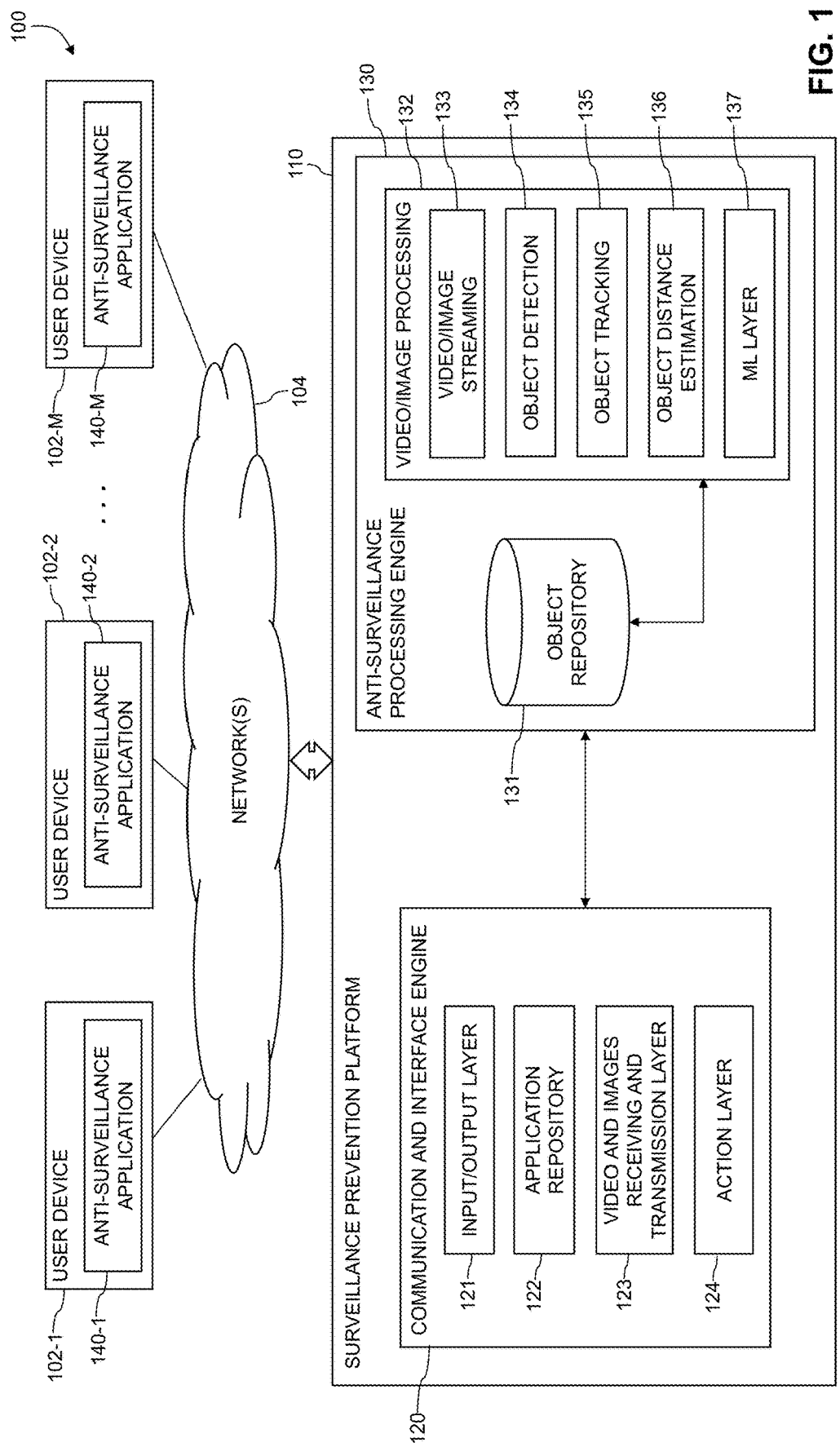
FIG. 1 depicts details of an information processing system with a surveillance prevention platform for detecting objects posing a security threat and recommending appropriate actions to maintain security according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "image" is to be broadly construed to refer to a visual representation which is, for example, captured by a device such as a camera (e.g., stand-alone camera or camera integrated into a device such as, but not necessarily limited to, a camera in a device like a mobile phone, tablet or laptop computer). Images may further include visual representations produced on an electronic display such as a computer screen or other screen of a device. An image as used herein may include, but is not limited to, a picture, a screen shot, window, message box, error message or other visual representation that may be produced on and/or captured by a device. Images can be in the form of one or more files in formats including, but not necessarily limited to, Joint Photographic Experts Group (JPEG), Portable Network Graphics (PNG), Graphics Interchange Format (GIF), and Tagged Image File (TIFF).

As used herein, a "video" or "videos" is to be broadly construed to refer to moving visual media such as, for example, movies, motion pictures, animations or other collections of moving images or visual representations. Videos can be captured by and/or produced on a device such as a camera in one or more formats such as, but not necessarily limited to, Moving Picture Experts Group (MPEG), Audio Video Interleave (AVI) and Windows Media Video (WMV). The cameras for capturing video may be the same as or similar to the cameras for capturing still or static images, and can be, for example, stand-alone cameras or cameras integrated into a device as described hereinabove.

In an illustrative embodiment, an anti-surveillance system prevents unauthorized parties from taking photographs of device screens displaying confidential, private or other types of sensitive data. The system permits users to register potentially vulnerable applications including sensitive data through an anti-surveillance application. Whenever registered applications are opened and/or initiated, a surveillance mode to detect unauthorized image capture objects, such as third party cameras, is enabled automatically. For example, a camera of a user device (e.g., internal laptop camera) is used to detect external objects such as, for example, mobile device cameras, that may be used to capture images of sensitive information from the user device. The anti-surveillance system is further configured to send alerts to users about detected external threats or other vulnerabilities and place an affected device into a secure mode by performing one or more actions such as, for example, blurring a screen, blacking out a screen, locking a screen, etc.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a surveillance prevention platform 110.

The user devices 102 can comprise, for example, Internet of Things (IoT) devices, desktop, laptop or tablet computers, mobile telephones, or other types of processing devices capable of communicating with the surveillance prevention platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The user devices 102 comprise one or more anti-surveillance applications 140-1, 140-2, . . . 140-M (collectively "anti-surveillance applications 140") running on the user devices 102. Alternatively, the anti-surveillance applications 140 may be running on separate devices from the user devices 102 and are accessible by the user devices 102.

The terms "client," "customer" or "user" herein are intended to be broadly construed so as to encompass numerous arrangements of human, hardware, software or firmware entities, as well as combinations of such entities. Surveillance prevention services may be provided for users utilizing one or more machine learning models, although it is to be appreciated that other types of infrastructure arrangements could be used. At least a portion of the available services and functionalities provided by the surveillance prevention platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the surveillance prevention platform 110, as well as to support communication between the surveillance prevention platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the surveillance prevention platform 110.

The surveillance prevention platform 110 in the present embodiment is assumed to be accessible to the user devices 102, and vice-versa, over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The surveillance prevention platform 110, on behalf of respective infrastructure tenants each corresponding to one or more users associated with respective ones of the user devices 102, provides a platform for detecting objects posing a security threat and recommending appropriate actions to maintain security.

Referring to FIG. 1, the surveillance prevention platform 110 comprises a communication and interface engine 120 and an anti-surveillance processing engine 130. The communication and interface engine 120 comprises input/output layer 121, an application repository 122, a video and images receiving and transmission layer 123 and an action layer 124. The anti-surveillance processing engine 130 comprises an object repository 131 and a video/image processing layer 132. The video/image processing layer 132 comprises a video/image streaming component 133, an object detection component 134, an object tracking component 135, and object distance estimation component 136 and a machine learning (ML) layer 137.

The anti-surveillance techniques of the embodiments ensure that information exposed on screens of user devices 102 such as, but not necessarily limited to, laptop or notebook computers, tablets, mobile phones and/or desktop computers, is available only to authorized users and not exposed to any non-authorized users or cameras. The communication and interface engine 120, and more particularly, the input/output layer 121, receives images and/or video input from cameras of user devices 102. Based on analysis of the received images and/or video performed by an anti-surveillance processing engine 130 using one or more machine learning models, the surveillance prevention platform 110 determines whether the received images and/or video depict at least one object (e.g., camera) configured to capture a visual representation of the screen of a user device 102. The screen may be displaying sensitive or confidential information associated with, for example, an individual and/or an enterprise. Responsive to a determination that an object posing a security threat (e.g., camera) is depicted in the received images and/or video, the surveillance prevention platform 110, more particularly, the action layer 124, generates a recommendation comprising at least one action to prevent the capture of the visual representation of the screen of the user device 102. The actions to prevent the capture of the visual representation of the screen comprise for example, concealing a display on the screen, closing one or more applications on the user device 102, and/or transmitting an alert to one or more users about the potential security threat. Alerts may be sent to, for example, registered government or enterprise officials and/or designated users via available messaging applications. Concealing the display on the screen comprises, for example, blurring the display, covering the display with an opaque image (e.g., blackout the screen), replacing the display with another display and/or replacing the display with a lock screen that requires a password to view the screen. The input/output layer 121 transmits the recommendations comprising the actions to the user devices 102 over the network 104. The recommendations are generated and transmitted to the devices 102 as a real-time response to determinations that objects posing security threats are depicted in images and/or video captured by cameras of the user devices 102.

The input/output layer 121 may format outputs from the action layer 124 to be received on and/or transmitted via one or more channels. The input/output layer 121 comprises one or more application programming interfaces (APIs) to interface with the channels, different elements of the surveillance prevention platform 110, the user devices 102 and/or the anti-surveillance applications 140. The input/output layer 121 facilitates interactions between devices of multiple types (e.g., physical, virtual, mobile, desktop) through multiple mediums (e.g., web, cellular, satellite, etc.). For example, the input/output layer 121 standardizes communications, and formats responses and/or action recommendations based on different interface types.

The communication and interface engine 120 of the surveillance prevention platform 110 comprises an application registry 122, which is a repository where applications of user devices 102 requiring protection are registered by, for example, users, administrators, and/or information technology (IT) professionals. Such applications requiring protection may be known by the users, administrators, and/or information technology (IT) professionals to include and/or use confidential, personal, private or other types of sensitive data that may be displayed when the applications are in use. A surveillance mode on a user device 102 can be enabled for applications and/or uniform resource locators (URLs) registered via an anti-surveillance application 140 on the user device 102. Due to registration, the surveillance prevention platform 110 is provided with knowledge that the application and/or URL contains sensitive data.

Figure 4:
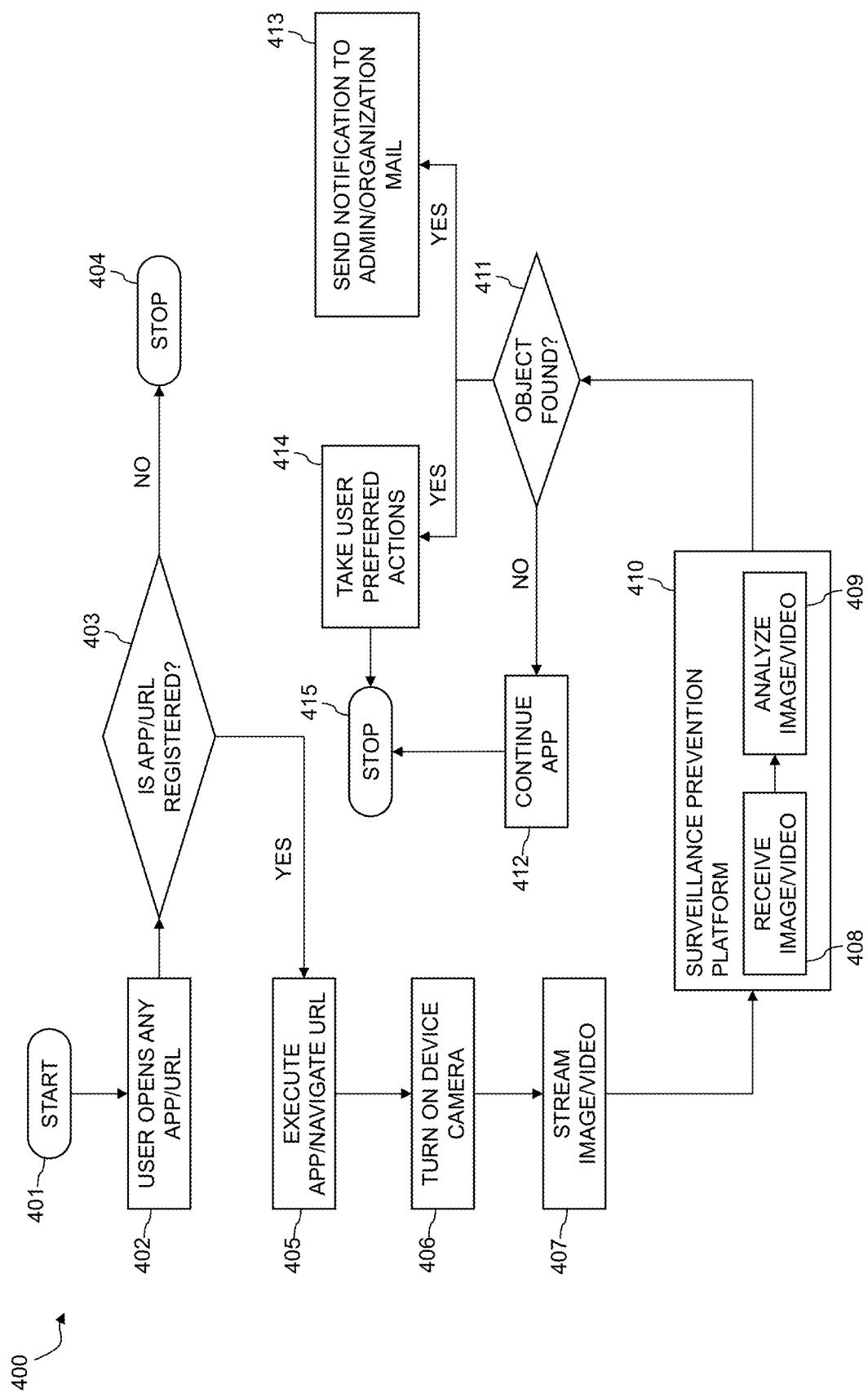
FIG. 4 depicts a flow diagram of a process for preventing surveillance according to an illustrative embodiment according to an illustrative embodiment.

Referring, for example, to blocks 401-405 of the flow diagram 400 of the process for preventing surveillance in FIG. 4, a surveillance mode on a user device 102 automatically becomes active when a user is working on a registered application or accesses a registered URL. For example, at the start of the process (block 401), a user opens an application or URL (block 402) and an inquiry is performed regarding whether the application or URL is registered (block 403). If the application or URL is not registered (i.e., is not in the application repository 122), then the process proceeds to block 404 and stops. If the application or URL is registered, then the process proceeds to block 405 where the application is executed or the website associated with the URL is navigated by a user. As a result of a registered application being opened or executed, or a registered URL being accessed or navigated via the user device 102, a surveillance mode on the user device 102 is automatically activated. Referring to blocks 406 and 407, activation of a surveillance mode on the user device 102 triggers a camera of a device to be in an "ON" state (block 406), where the camera actively scans for third party cameras (e.g., mobile device cameras or other types of cameras) that may capture an image, video or other visual representation of sensitive information from the screen of the user device 102. Referring to block 407, the surveillance prevention platform 110, via the input/output layer 121 and the video and images receiving and transmission layer 123, receives streamed images and/or video from the user device 102 to be analyzed by the anti-surveillance processing engine 130. The video and images receiving and transmission layer 123 provides the streamed images and/or video from the user device 102 to the anti-surveillance processing engine 130, which, as per blocks 408 and 409 of the surveillance prevention platform 410, receives and analyzes the images/video.

The video/image streaming component 133 of the video/image processing layer 132 receives the images/video and provides the images/video to the object detection, object tracking, and object distance components 134, 135 and 136 and to the ML layer 137 for analysis. In order to detect objects posing a threat, the object detection component 134 implements continuous object detection analysis by continuously analyzing streaming images and/or video.

The object detection component 134 utilizes algorithms to generate bounding boxes which may contain objects posing a threat. The bounding boxes are generated in the inputted images and/or video. The object detection component 134 classifies the objects in respective ones of the bounding boxes. Referring, for example, to the flow 600 FIG. 6, in one or more embodiments, the object detection component 134 classifies images using a faster convolutional neural network (F-CNN). A convolution is a combined integration of two functions that shows how one function modifies the other. In accordance with an embodiment, a CNN comprising convolutional layers 602 receives an input image 601, which is processed through a feature detector (also referred to herein as a "filter") and generates one or more feature maps 603. A region proposal network (RPN) 604 provides a plurality of regions (proposals 605), which are then passed to deep learning (DL) based classification from a hierarchical grouping algorithm in region-based convolutional neural networks (RCNNs), and then to using CNNs and region of interest (ROI) pooling 606 in fast RCNNs. A classifier 607 classifies the objects in respective ones of the bounding boxes as being objects posing a security threat (e.g., cameras) or as other types of objects. The classification is based, at least in part, on data from an object repository 131, which includes previously classified objects and their configurations that may have posed security threats to user devices 102. The data from the object repository 131 is used to train the ML layer 137, through which the machine learning algorithms are processed for the object detection, tracking and distance components 134, 135 and 136.

Figure 6:
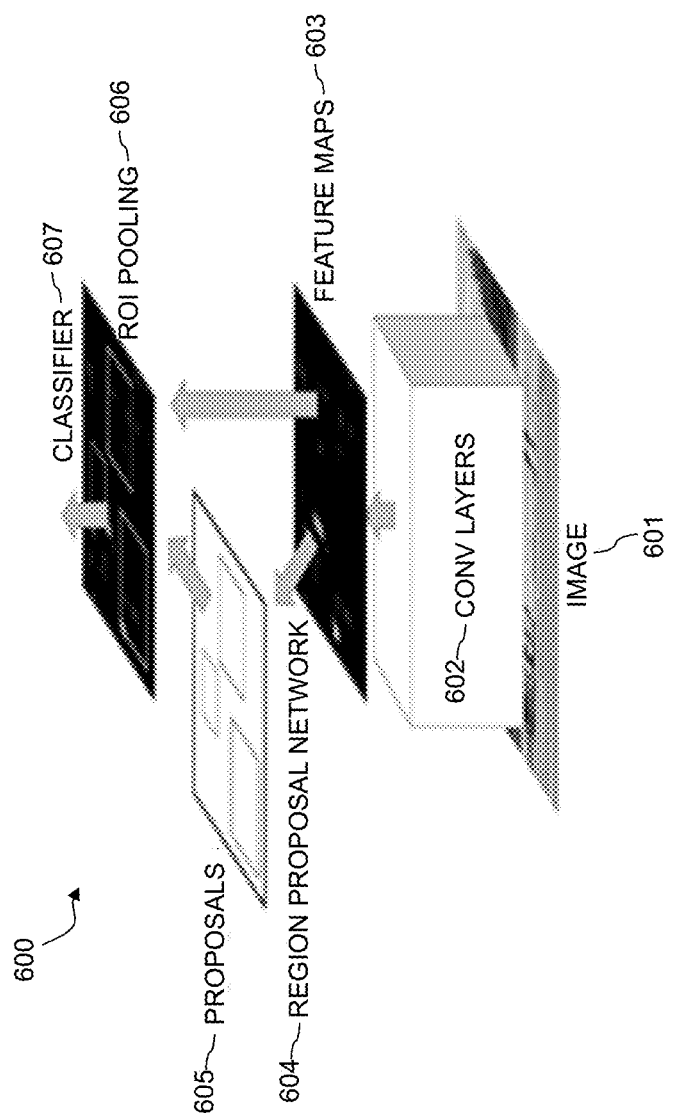
FIG. 6 depicts an object detection component according to an illustrative embodiment.
Figure 7:
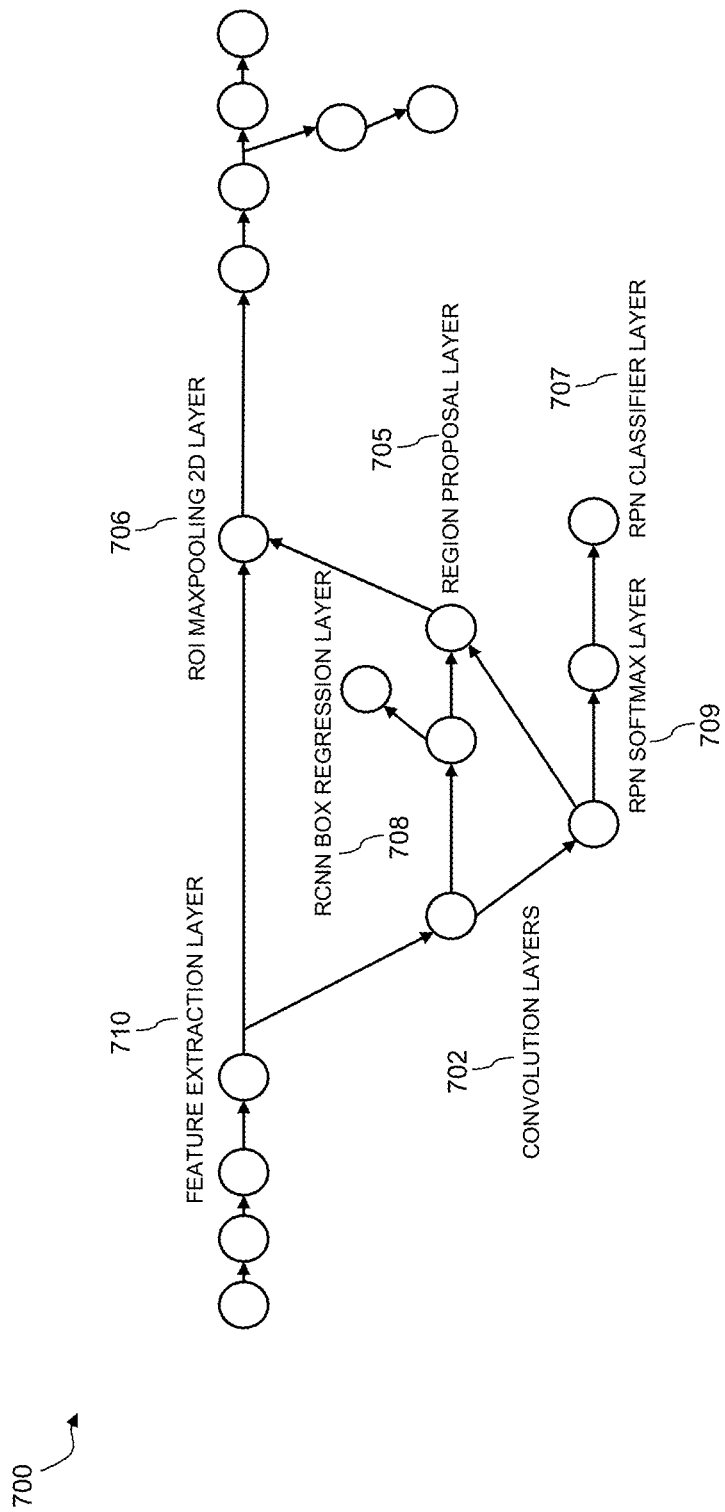
FIG. 7 depicts a diagram of a convolutional neural network (CNN) according to an illustrative embodiment.

FIG. 7 illustrates a diagram of an F-CNN 700 comprising a feature extraction layer 710 (the same or similar to the feature detector discussed in connection with FIG. 6), an ROI max pooling two-dimensional (2D) layer 706 (the same or similar to the ROI pooling layer 606), an RCNN box regression layer 708, a region proposal layer 705 providing proposals (e.g., proposals 605), convolution layers 702 (the same or similar to the convolution layers 602), an RPN SoftMax layer 709 and an RPN classifier layer 707 (the same or similar to classifier 607).

The object tracking component 135 determines positions of an object in images and/or video streams at different times, generates bounding boxes around the object at the different times, and plots the determined positions of the object on a confidence map (e.g., heatmap). Tracking an object in a video sequence can result in losing the object in some of the frames. The object tracking component 135 estimates new positions of the object in situations where the object may be lost. In cases where objects in certain frames may not be detected by an object detection algorithm, the object tracking component 135 calculates the positions of the objects using the information of their positions in the previous frames. For each tracked object, the object tracking component 135 calculates the object's speed (in pixels/s) at a time t, which is the difference of coordination points of bounding box centers between positions of the given object in frames at times t and t−1.

The object tracking component 135 employs a single object tracking method that combines object detection and recurrent neural networks (RNNs). For example, the object tracking component 135 utilizes recurrent YOLO (You Only Look Once) (ROLO) techniques, which combine YOLO and long short-term memory (LSTM) machine learning techniques. For example, the object detection component 134 uses YOLO techniques to collect visual features, along with location inference priors. At each time-step (frame), an LSTM model receives an input feature vector of length 4096 dimensional visual features and the object tracking component 135 returns the location of the tracked object. The locations on the heatmap increase in intensity based on where the object is moving or predicted to be moving. The object tracking component 135 determines whether a detected object is in a location proximate to the user device 102, and in an orientation or configuration where the object is capable of capturing a visual representation of the screen of the user device 102. For example, the object tracking component 135 determines an angle of the object with respect to the screen of the user device 102, and based on historical data determines whether the object is oriented to accurately capture the visual representation of the screen and/or an attempt is being made by an unauthorized person to capture the visual representation.

Figure 8:
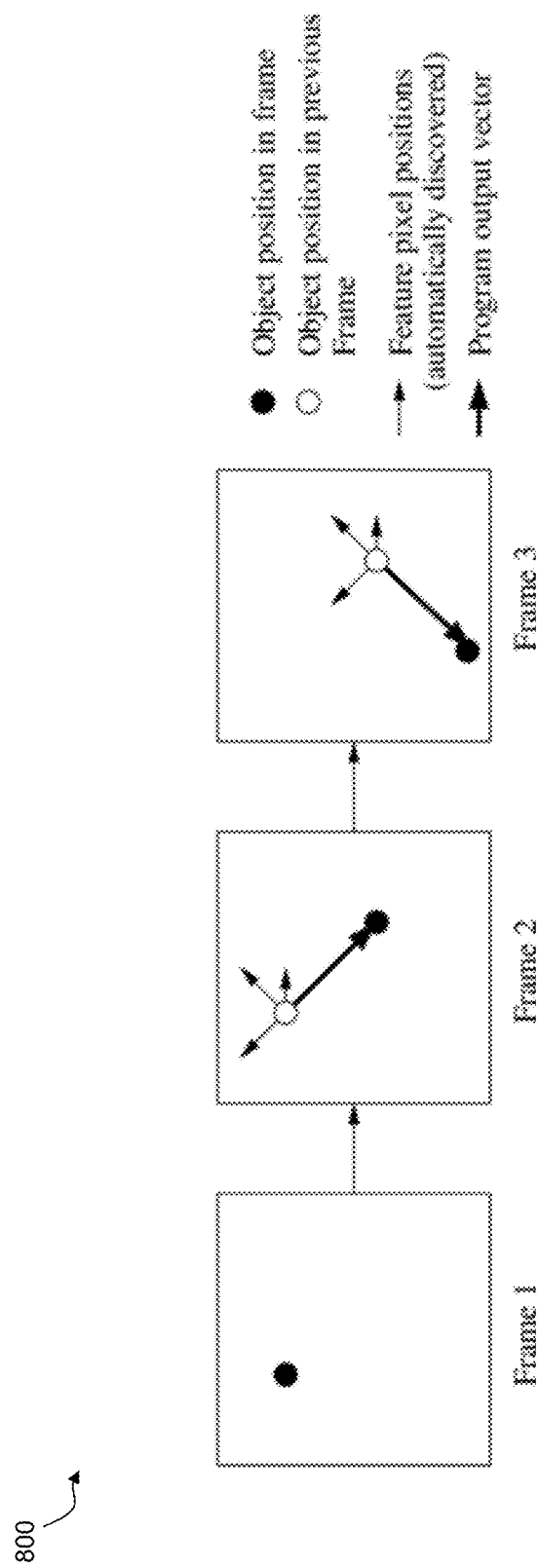
FIG. 8 depicts details of object distance estimation according to an illustrative embodiment.

The object distance estimation component 136 computes a distance of an object in images and/or video streams from a given point and/or a given line. For example, referring to the flow 800 in FIG. 8, to reduce vagueness of position estimations provided by an object detection algorithm employed by the object detection component 134, the object distance estimation component 136 computes final speed as a moving average of values calculated over one or more preceding frames. In the case of no object detection in a current frame (e.g., in Frame 2 or Frame 3), the object distance estimation component 136 assumes that an object has the same speed as a previous frame (Frame 1 in the case of current Frame 2 or Frame 2 in the case of current Frame 3), and assumes that the dimensions and ordinate of its bounding box are the same as the previously calculated dimensions and ordinate for a previous frame. In using the previous frame(s) as a reference, the distance estimation component relies on Euclidean distance or the Euclidean metric to compute the estimated distance from a point or line, The Euclidean distance or the Euclidean metric is the ordinary straight-line distance between two points in Euclidean space. The object distance estimation component 136 estimates the actual distance of the object from the user device 102 and whether, based on the estimated distance, whether the object is capable of capturing a visual representation of the screen of the user device 102.

Referring back to FIG. 4, at block 411 if the surveillance prevention platform 110 determines that an object configured to capture a visual representation of a screen of user device 102 is present, and that the object is in a position and/or orientation to capture the visual representation, the action layer 124, upon receiving inputs from the object detection, tracking, and distance estimation components 134, 135 and 136, applies pre-programmed rules to recommend appropriate actions defined by users. For example, as shown in blocks 413 and 414, the recommended actions may include sending a notification about the threatening object to a user (e.g., administrator) over an available communication medium (e.g., organizational email) or taking user preferred actions such as, but not necessarily limited to, blurring or otherwise concealing the screen, locking the device and/or generating a pop-up window to conceal the screen, and the process stops at block 415. The recommended action(s) are sent by the input/output layer 121 to a user device 102 as a real-time response to receipt by the surveillance prevention platform 110 of the images and/or video streams from the camera of the user device 102. In one or more embodiments, the action layer 124 is configured to automatically send an alert based on user preferences to the appropriate parties and/or automatically initiate execution of one or more of the actions on the user device 102 to prevent a discovered object from capturing the visual representation of the screen of the user device 102.

Alternatively, at block 411, if the surveillance prevention platform 410 (which is the same or similar to surveillance prevention platform 110) determines that an object configured to capture a visual representation of a screen of user device 102 is not present, the application continues to execute a registered application at block 412 (or the user continues to browse a website associated with a registered URL) and the process stops at block 415.

Figure 5:
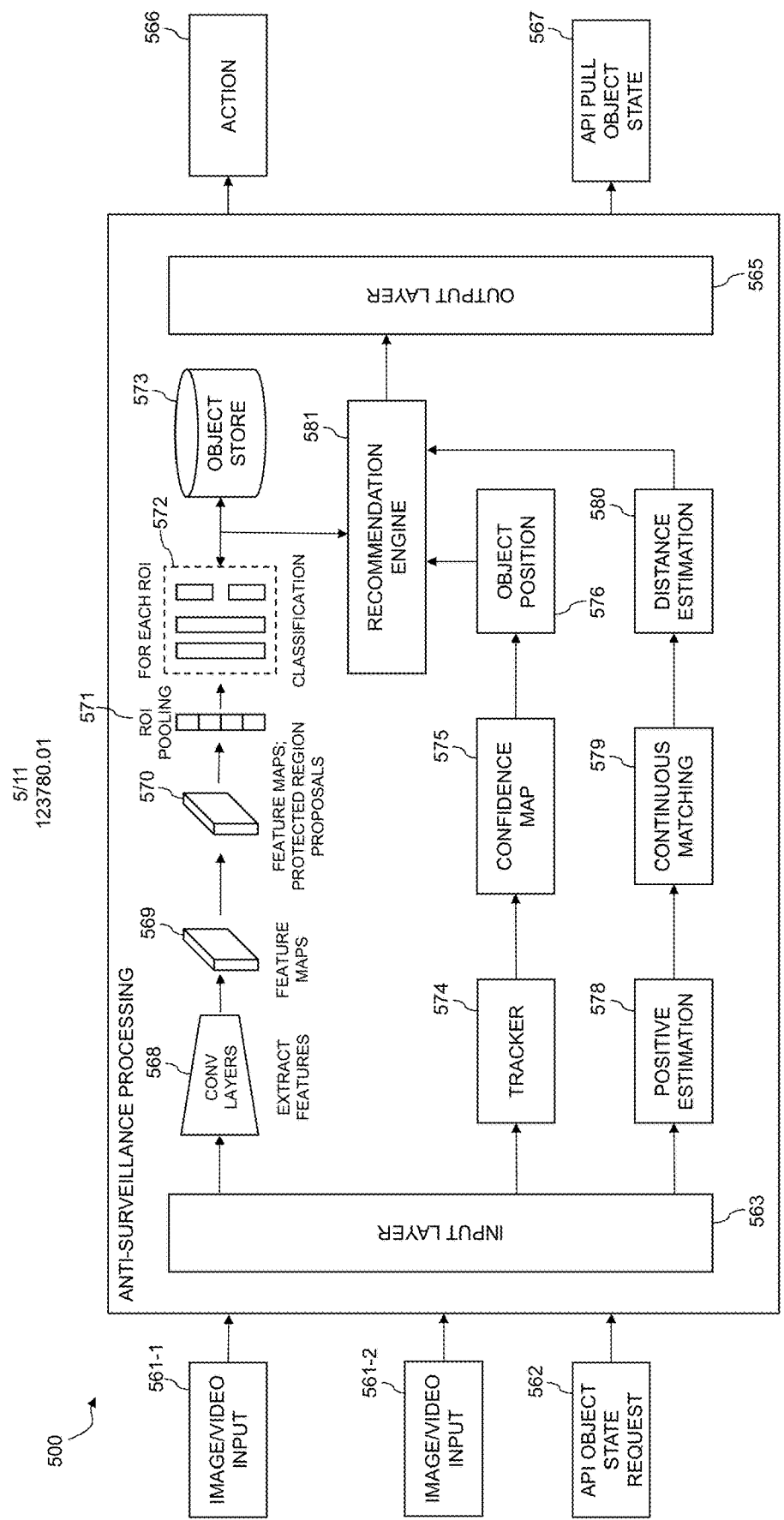
FIG. 5 depicts a block diagram of operations for preventing surveillance according to an illustrative embodiment according to an illustrative embodiment.

Referring to FIG. 5, a block diagram 500 of operations for preventing surveillance further illustrates anti-surveillance processing performed by the surveillance prevention platform 110. Image and/or video streaming inputs 561-1 and 561-2 are captured by the camera of a user device 102 and provided to the surveillance prevention platform 110.

Although two inputs are shown, the embodiments are not limited thereto, and there may be more or less image and/or video inputs. The inputs are processed by an input layer 563 (which is the same or similar to the input/output layer 121). The input layer 563, like the input/output layer 121, comprises one or more application APIs to interface with the channels, different elements of the surveillance prevention platform 110, the user devices 102 and/or the anti-surveillance applications, and facilitates interactions between devices of multiple types.

The input layer 563 provides the image and/or video streaming inputs 561-1 and 561-2 to elements used for object detection, such as, for example, convolutional layers 568, feature maps 569 and RPNs 570. Similar to the processing discussed herein in connection with FIG. 6, convolutional layers 568 are used to extract features by processing inputted images and/or video through a feature detector (e.g., filter) to generate one or more feature maps 569. RPNs 570 provide a plurality of protected region proposals, which are then passed to DL-based classification in RCNNs, and then to using ROI pooling 571 in fast RCNNs. For each ROI, classification 572 of the objects in respective ones of bounding boxes as being objects posing a security threat (e.g., cameras) or as other types of objects is performed. The classification is based, at least in part, on data from an object store 573 (the same or similar to object repository 131), which includes previously classified objects and their configurations that may have posed security threats to user devices 102. In addition, the data in the object store 573 (and the object repository 131) can include data about different types of cameras (e.g., mobile or stand-alone cameras) and their capabilities including, but not necessarily limited to, zoom capabilities, clarity, pixel count, etc., which may affect a decision of the surveillance prevention platform 110 whether the camera poses a security threat at a particular distance from or orientation with respect to the screens of a user device 102. Object classification may include such details as camera make and model, and such details, along with timestamps, information about a user of the user device 102 and details about the user device 102 can be sent in messages including alerts about a potential threat.

The input layer 563 provides the image and/or video streaming inputs 561-1 and 561-2 to an object tracker 574, which is the same or similar to the object tracking component 135. Similar to the object tracking component 135, the object tracker 574 utilizes ROLO techniques, which combine YOLO and LSTM machine learning techniques to return object position 576 of a tracked object. As described herein above, locations on a confidence map 575 (e.g., heatmap) increase in intensity based on where an object is moving or predicted to be moving. The object position 576 provides details about whether an object is relatively close to a user device 102, and in an orientation or configuration where the object may be capable of capturing a visual representation of the screen of the user device 102.

The input layer 563 provides the image and/or video streaming inputs 561-1 and 561-2 to elements used for object distance estimation to perform positive estimation 578, continuous matching 579 and render a distance estimation 580 using the same or similar techniques to those described hereinabove in connection with the object distance estimation component 136.

The recommendation engine 581, which is the same or similar to the action layer 124 receives object detection, tracking, and distance estimation outputs. The recommendation engine 581 applies pre-programmed rules to recommend appropriate actions defined by users based on the object detection, tracking, and distance estimation outputs. As noted hereinabove, the recommended actions may include sending a notification about the threatening object to a user over an available communication medium and/or taking user specified actions such as, but not necessarily limited to, blurring or otherwise concealing the screen of an affected user device 102, locking the user device 102, wherein a password or other unlocking mechanism (e.g., biometrics) is required to access the user device 102 and/or generating a pop-up or other window to conceal the screen. The recommended action(s) 566 are sent by the output layer 565 (which as the same or similar configuration as the input/output layer 121) to a user device 102 as real-time response to receipt by the surveillance prevention platform 110 of the images and/or video streams from the camera of the user device 102.

As shown in FIG. 5, an API including a request to determine an object state 562 is input to the surveillance prevention platform 110 to request that the surveillance prevention platform analyze received images and/or video streams to determine the state of objects around a user device. An API including a request to pull an object state 567 is utilized to provide object states, such as classification, position and distance of the object, to the user device 102 upon completion of the analysis by the surveillance prevention platform 110.

Figure 2:
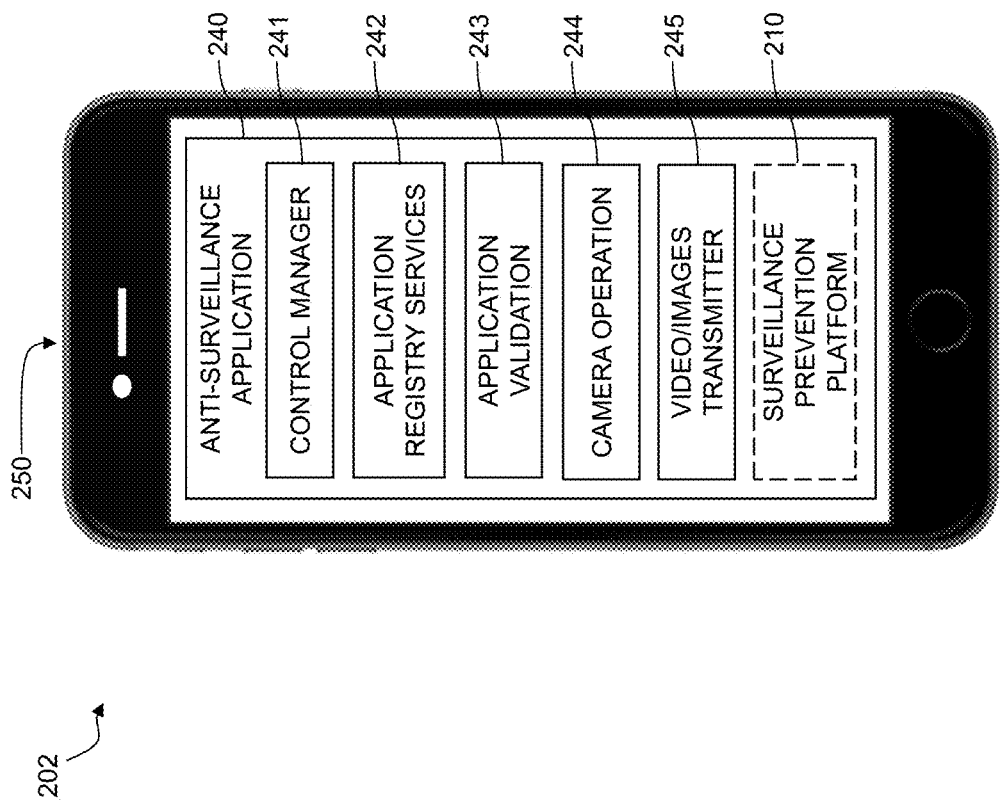
FIGS. 2 and 3 depict example user devices configured for protection by the surveillance prevention platform according to illustrative embodiments.
Figure 3:
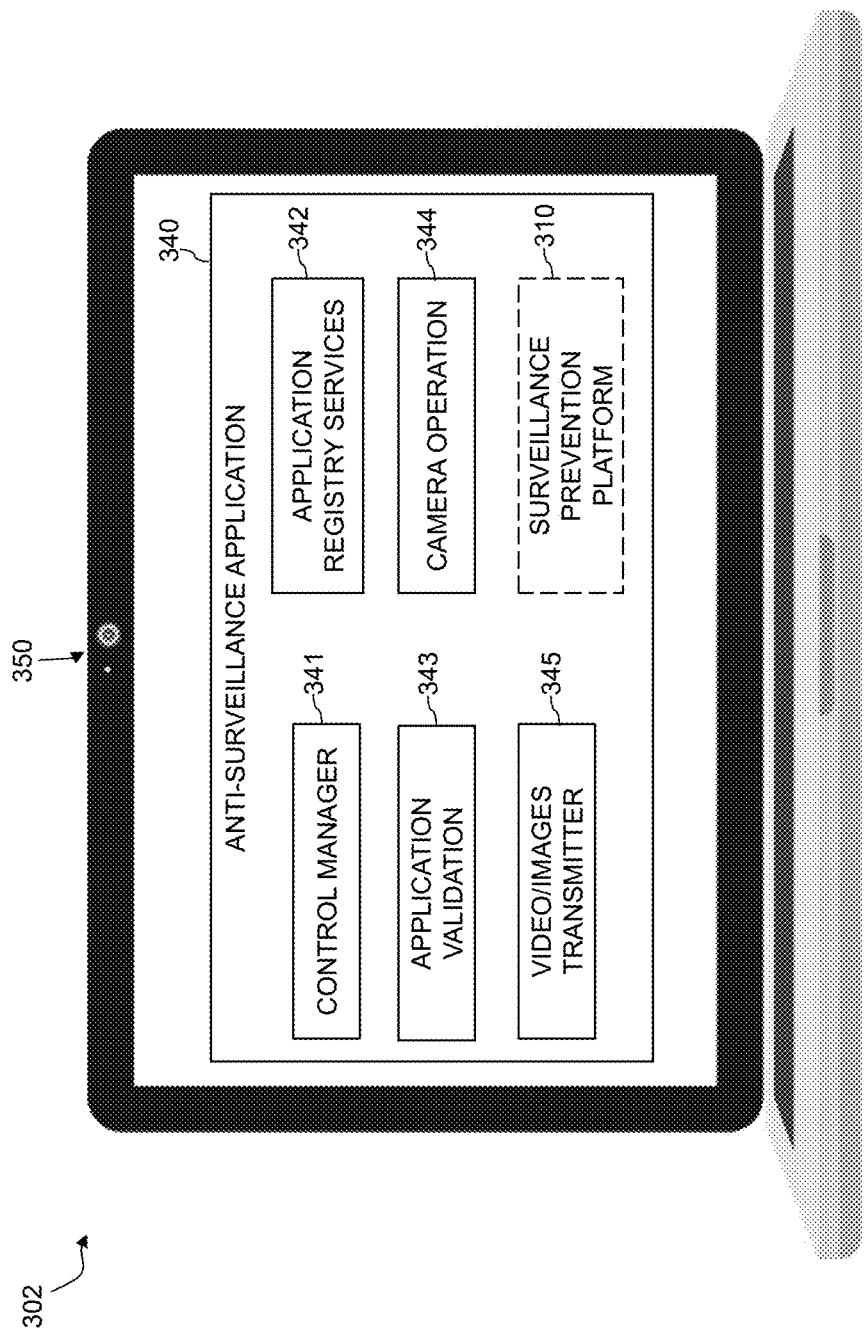

Referring to FIGS. 2 and 3, example user devices 202 and 302 are shown. The user device 202 comprises a mobile phone with a camera 250 and the user device 302 comprises a laptop computer with a camera 350. Each of the user devices 202 and 302 comprises an anti-surveillance application 240 and 340, which is the same or similar to the anti-surveillance applications 140. The anti-surveillance applications 240 and 340 comprise, for example, a control manager 241/341, an application registry services component 242/342, an application validation component 243/343, a camera operation component 244/344 and a video/images transmitter 245/345. The applications registry services component 242/342 is used to register applications of user devices 202/302 and/or URLs requiring protection. When a registered application is opened and/or a registered URL is accessed, an application validation component 243/343 communicates with a surveillance prevention platform 210/310 (which is the same or similar to the surveillance prevention platform 110) to validate that an application and/or URL is registered in the application repository 122. In addition, upon opening of a registered application and/or accessing a registered URL, a control manager 241/341 places the user device 202/302 into a surveillance mode. The control manager 241/341 monitors the user device 202/302 to determine when registered applications are opened and closed, and when registered URLs are accessed or closed so as to control enabling and disabling of surveillance mode.

Responsive to activation of a surveillance mode on the user device 202/302, the control manager 241/341 triggers a camera operation component 244/344 to place the camera 250/350 of the device 202/302 into an "ON" state, where the camera 250/350 actively scans for third party cameras (e.g., mobile device cameras or other types of cameras) that may capture an image, video or other visual representation of sensitive information from the screen of the device 202/302. A video/image transmitter 245/345 transmits images and/or video streams captured by the camera 250/350 to the surveillance prevention platform 210/310 for analysis.

Following analysis by the surveillance prevention platform 210/310 and determination of the presence of an object which is a threat to the security of the device 202/302, the device 202/302 receives recommended action(s) sent by the surveillance prevention platform 210/310. As noted herein, the actions to prevent the capture of the visual representation of the screen of the user device 202/302 comprise for example, concealing a display on the screen, closing one or more applications on the device 202/302, and/or transmitting an alert to one or more users about the potential security threat. In response to receiving a recommended action, the control manager 241/341 controls the user device 202/302 to perform the recommended action(s), such as, for example blurring the display, covering the display with an opaque image (e.g., blacking out the screen), replacing the display with another display, replacing the display with a lock screen that requires a password to view the screen, and/or transmitting an alert to one or more specified users about the potential security threat. In one or more embodiments, when in surveillance mode, the camera 250/350 also actively scans for faces and/or other biometric features of authorized users and the control manager 241/341 can trigger an alert or protective action as described herein in the absence of an authorized user or upon detection of an unauthorized user.

The user devices 102, 202 and 302 communicate with the surveillance prevention platforms 110, 210 or 310 over a network, such as, for example, network 104. Alternatively, in one or more embodiments, the surveillance prevention platform 110, 210 or 310 is present on the user device 102, 202 or 302.

According to one or more embodiments, one or more of the databases, repositories and/or stores (e.g., application repository 122, object repository 131, object store 573) used by the surveillance prevention platform 110 can be configured according to a relational database management system (RDBMS) (e.g., PostgreSQL). Databases, data repositories and/or data stores in some embodiments are implemented using one or more storage systems or devices associated with the surveillance prevention platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the surveillance prevention platform 110, the communication and interface engine 120 and the anti-surveillance processing engine 130 in other embodiments can be implemented at least in part externally to the surveillance prevention platform 110, for example, as stand-alone servers, sets of servers or other types of systems coupled to the network 104. For example, the communication and interface engine 120 and the anti-surveillance processing engine 130 may be provided as cloud services accessible by the surveillance prevention platform 110.

The communication and interface engine 120 and the anti-surveillance processing engine 130 in the FIG. 1 embodiment are each assumed to be implemented using at least one processing device. Each such processing device generally comprises at least one processor and an associated memory, and implements one or more functional modules for controlling certain features of the communication and interface engine 120 and/or the anti-surveillance processing engine 130.

At least portions of the surveillance prevention platform 110 and the components thereof may be implemented at least in part in the form of software that is stored in memory and executed by a processor. The surveillance prevention platform 110 and the components thereof comprise further hardware and software required for running the surveillance prevention platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the communication and interface engine 120, the anti-surveillance processing engine 130 and other components of the surveillance prevention platform 110 in the present embodiment are shown as part of the surveillance prevention platform 110, at least a portion of the communication and interface engine 120, the anti-surveillance processing engine 130 and other components of the surveillance prevention platform 110 in other embodiments may be implemented on one or more other processing platforms that are accessible to the surveillance prevention platform 110 over one or more networks. Such components can each be implemented at least in part within another system element or at least in part utilizing one or more stand-alone components coupled to the network 104.

It is assumed that the surveillance prevention platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the communication and interface engine 120, the anti-surveillance processing engine 130 and other components of the surveillance prevention platform 110, and the elements thereof can each be implemented in the form of one or more LXCs running on one or more VMs. Other arrangements of one or more processing devices of a processing platform can be used to implement the communication and interface engine 120 and the anti-surveillance processing engine 130, as well as other components of the surveillance prevention platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the surveillance prevention platform 110 to reside in different data centers. Numerous other distributed implementations of the surveillance prevention platform 110 are possible.

Accordingly, one or each of the communication and interface engine 120, the anti-surveillance processing engine 130 and other components of the surveillance prevention platform 110 can each be implemented in a distributed manner so as to comprise a plurality of distributed components implemented on respective ones of a plurality of compute nodes of the surveillance prevention platform 110.

It is to be appreciated that these and other features of illustrative embodiments are presented by way of example only, and should not be construed as limiting in any way.

Accordingly, different numbers, types and arrangements of system components such as the communication and interface engine 120, the anti-surveillance processing engine 130 and other components of the surveillance prevention platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the surveillance prevention platform can be offered to cloud infrastructure customers or other users as part of FaaS, CaaS and/or PaaS offerings.

Figure 9:
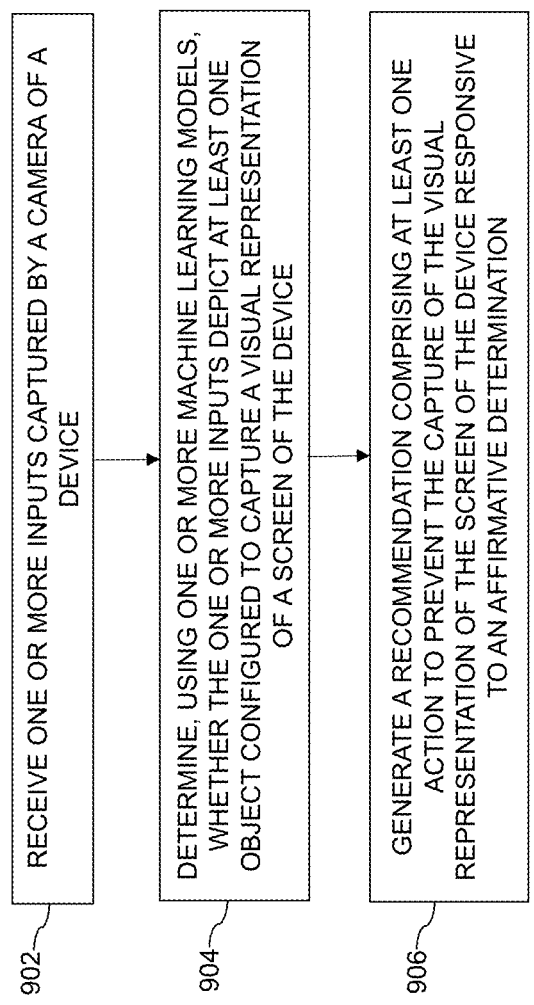
FIG. 9 depicts a process for detecting objects posing a security threat and recommending appropriate actions to maintain security according to an illustrative embodiment.

The operation of the information processing system 100 will now be described in further detail with reference to the flow diagram of FIG. 9. With reference to FIG. 9, a process 900 for detecting objects posing a security threat and recommending appropriate actions to maintain security as shown includes steps 902 through 906, and is suitable for use in the system 100 but is more generally applicable to other types of information processing systems comprising a surveillance prevention platform configured for detecting objects posing a security threat and recommending appropriate actions to maintain security.

In step 902, one or more inputs captured by a camera of a device are received. In step 904, using one or more machine learning models, there is a determination whether the one or more inputs depict at least one object configured to capture a visual representation of a screen of the device. In one or more embodiment, the object comprises a camera separate from the device.

In step 906, a recommendation is generated responsive to an affirmative determination that the one or more inputs depict at least one object configured to capture a visual representation of a screen of the device. The recommendation comprises at least one action to prevent the capture of the visual representation of the screen of the device. The one or more inputs comprise at least one of one or more video streams and one or more still images including the at least one object.

In one or more embodiments, determining whether the one or more inputs depict at least one object configured to capture the visual representation of the screen of the device comprises: (i) generating one or more bounding boxes in the one or more inputs, wherein the one or more bounding boxes are formed around objects in the one or more inputs potentially configured to capture the visual representation of the screen of the device; and (ii) classifying the objects in respective ones of the one or more bounding boxes. The generating and the classifying are performed using the one or more machine learning models comprising, for example, a CNN.

In one or more embodiments, determining whether the one or more inputs depict at least one object configured to capture the visual representation of the screen of the device comprises: (i) determining positions of the at least one object at different times; (ii) generating bounding boxes around the at least one object at the different times; and (iii) plotting the determined positions of the at least one object on a confidence map.

In one or more embodiments, determining whether the one or more inputs depict at least one object configured to capture the visual representation of the screen of the device comprises computing a distance of the at least one object from at least one of a given point and a given line.

The at least one action to prevent the capture of the visual representation of the screen comprises concealing a display on the screen, wherein concealing the display on the screen comprises at least one of blurring the display, covering the display with an opaque image, replacing display with another display and replacing the display with a lock screen.

The at least one action to prevent the capture of the visual representation of the screen may also comprise closing one or more applications on the device and/or transmitting an alert based at least in part on the affirmative determination to one or more users.

The recommendation comprising the at least one action is transmitted to the device, and the recommendation is generated and transmitted to the device as a real-time response to the affirmative determination that the one or more inputs depict at least one object configured to capture a visual representation of a screen of the device.

In illustrative embodiments, a registry of one or more applications of the device is maintained, wherein opening of the one or more applications automatically triggers the camera of the device to capture the one or more inputs.

It is to be appreciated that the FIG. 9 process and other features and functionality described above can be adapted for use with other types of information systems configured to execute surveillance prevention services in a surveillance prevention platform or other type of platform.

The particular processing operations and other system functionality described in conjunction with the flow diagram of FIG. 9 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a surveillance prevention platform as disclosed herein can provide a number of significant advantages relative to conventional arrangements. For example, unlike conventional techniques, the embodiments advantageously use machine learning techniques to analyze incoming image and/or video inputs for objects posing a security threat to a device and recommend appropriate protective actions. The embodiments advantageously provide functionality for automatically entering into a surveillance mode upon activation of registered applications associated with sensitive information. While in surveillance mode, a camera of a device actively scans an area around a device for objects such as external cameras, which may be capable of capturing visual representations of the screen of the device when the screen is displaying sensitive or confidential information. As an additional advantage, the embodiments recommend and trigger appropriate actions to prevent unauthorized access to the sensitive information upon determining the presence of an unauthorized camera or other object. For example, the actions to ensure that unauthorized users do not take images of the sensitive data on the screen of a device include sending alerts to users, organizations and/or other concerned entities about the detected external threats and/or putting the device into a protective configuration by, for example, concealing and/or locking a screen and/or closing the application or a website displaying the sensitive information.

Advantageously, the embodiments provide an optimized machine learning framework that combines select machine learning techniques to provide object detection, object tracking and object distance estimation to determine the presence of objects that can capture visual representations of device screens displaying sensitive data. In addition, an anti-surveillance application on a device can be configured to automatically switch between surveillance and non-surveillance modes as a user switches between applications registered as vulnerable and not registered as vulnerable.

Current security techniques, such as, for example, role-based access control, data access control, encryption and decryption fail to prevent external objects from accessing data through camera snapshots and videos. Unlike current approaches, the embodiments permit device cameras to be used to detect external (e.g., third party) cameras that may be used to capture photographs and/or video of an exposed screen on a device, and enable the devices to take protective measures responsive to such detection.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the surveillance prevention platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a surveillance prevention platform in illustrative embodiments. These and other cloud-based systems in illustrative embodiments can include object stores.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
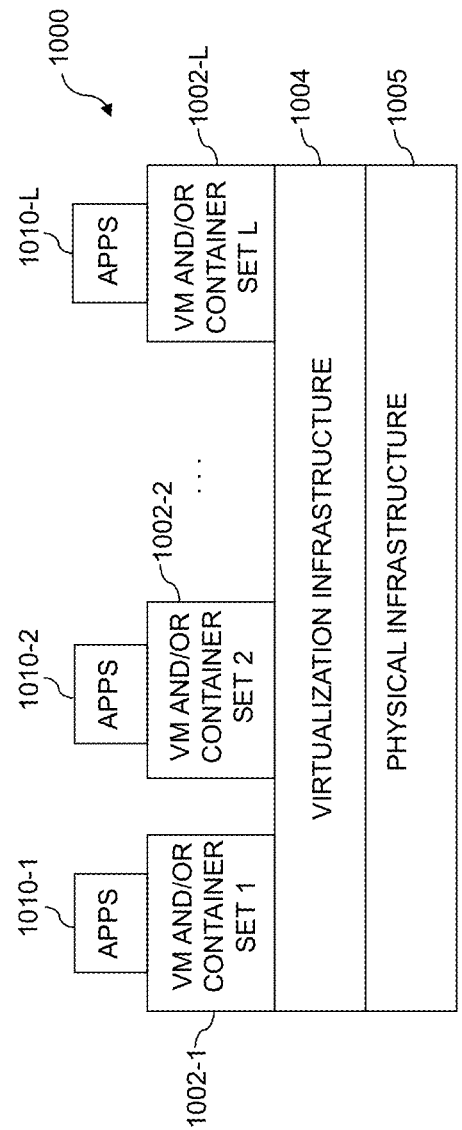
FIGS. 10 and 11 show examples of processing platforms that may be utilized to implement at least a portion of an information processing system according to illustrative embodiments.
Figure 11:
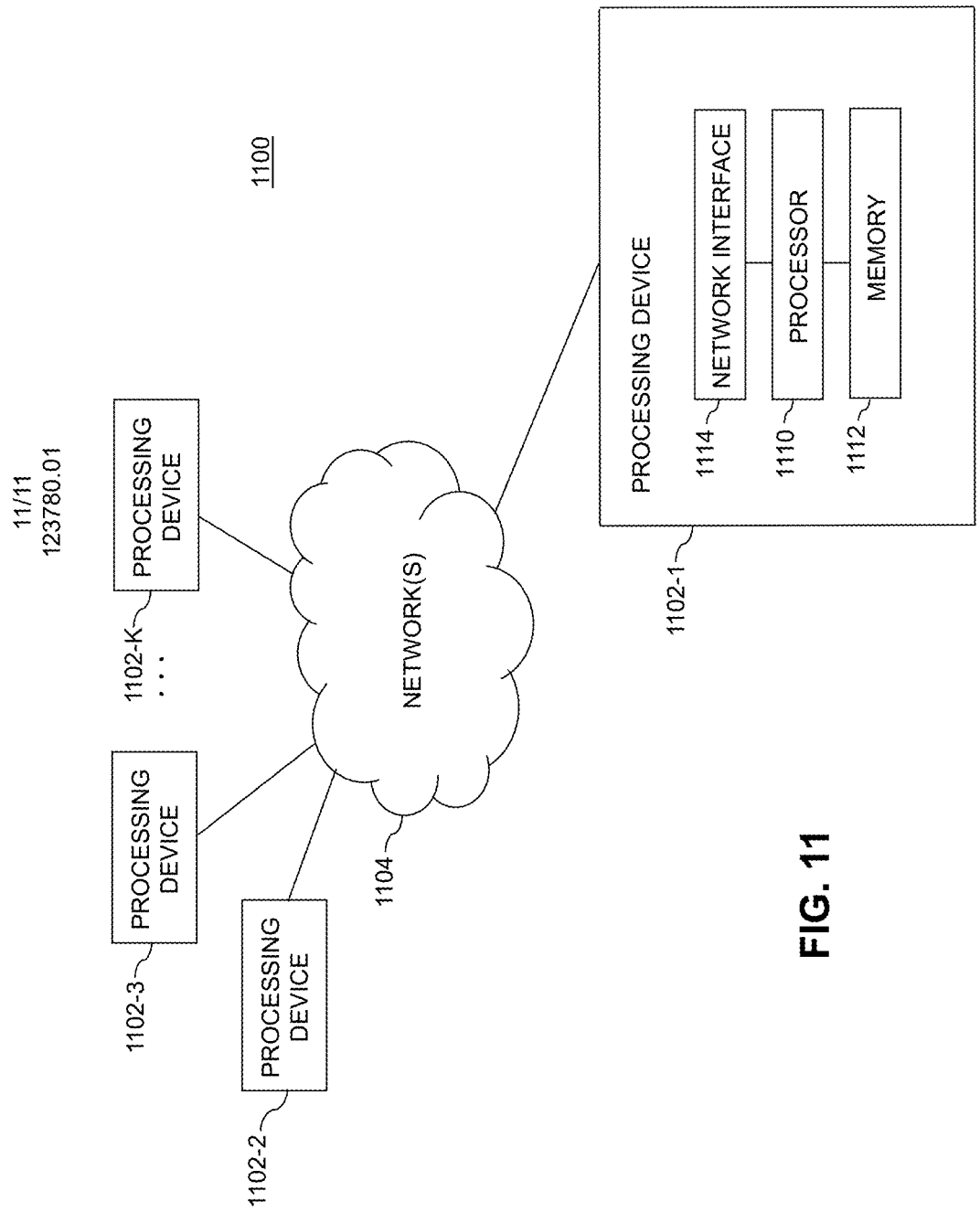

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112. The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the surveillance prevention platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and surveillance prevention platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   receiving one or more inputs captured by a camera of a device;
   determining, using one or more machine learning models, whether the one or more inputs depict at least one object configured to capture a visual representation of a screen of the device; and
   generating a recommendation comprising at least one action to prevent the capture of the visual representation of the screen of the device responsive to an affirmative determination;
   wherein determining whether the one or more inputs depict at least one object configured to capture the visual representation of the screen of the device comprises determining an angle of the at least one object with respect to the screen, and using historical data to determine whether the angle orients the at least one object in a position to enable the capture of the visual representation of the screen; and
   wherein the steps of the method are executed by a processing device operatively coupled to a memory.

2. The method claim 1, wherein determining whether the one or more inputs depict at least one object configured to capture the visual representation of the screen of the device further comprises:
   generating one or more bounding boxes in the one or more inputs, wherein the one or more bounding boxes are formed around objects in the one or more inputs potentially configured to capture the visual representation of the screen of the device; and classifying the objects in respective ones of the one or more bounding boxes;

wherein the generating and the classifying are performed using the one or more machine learning models.

3. The method claim 2, wherein the one or more machine learning models comprises a convolutional neural network (CNN).

4. The method of claim 1, wherein determining whether the one or more inputs depict at least one object configured to capture the visual representation of the screen of the device further comprises:

determining positions of the at least one object at different times; and generating bounding boxes around the at least one object at the different times.

5. The method of claim 4, wherein determining whether the one or more inputs depict at least one object configured to capture the visual representation of the screen of the device further comprises plotting the determined positions of the at least one object on a confidence map.

6. The method of claim 4, wherein the one or more inputs comprise one or more video streams including the at least one object.

7. The method of claim 1, wherein determining whether the one or more inputs depict at least one object configured to capture the visual representation of the screen of the device further comprises computing a distance of the at least one object from at least one of a given point and a given line.

8. The method of claim 1, wherein the one or more inputs comprise at least one of one or more video streams and one or more still images including the at least one object.

9. The method of claim 1, wherein the at least one action to prevent the capture of the visual representation of the screen comprises concealing a display on the screen.

10. The method of claim 9, wherein concealing the display on the screen comprises at least one of blurring the display, covering the display with an opaque image, replacing the display with another display and replacing the display with a lock screen.

11. The method of claim 1, wherein the at least one action to prevent the capture of the visual representation of the screen comprises closing one or more applications on the device.

12. The method of claim 1, wherein the at least one action to prevent the capture of the visual representation of the screen comprises transmitting an alert based at least in part on the affirmative determination to one or more users.

13. The method of claim 1, further comprising transmitting the recommendation comprising the at least one action to the device, wherein the recommendation is generated and transmitted to the device as a real-time response to the affirmative determination.

14. The method of claim 1, further comprising maintaining a registry of one or more applications of the device, wherein opening of the one or more applications automatically triggers the camera of the device to capture the one or more inputs.

15. The method of claim 1, wherein the at least one object comprises a camera separate from the device.

16. An apparatus comprising:

a processing device operatively coupled to a memory and configured to:

receive one or more inputs captured by a camera of a device;

determine, using one or more machine learning models, whether the one or more inputs depict at least one object configured to capture a visual representation of a screen of the device;

generate a recommendation comprising at least one action to prevent the capture of the visual representation of the screen of the device responsive to an affirmative determinations;

wherein, in determining whether the one or more inputs depict at least one object configured to capture the visual representation of the screen of the device, the processing device is further configured to determine an angle of the at least one object with respect to the screen, and use historical data to determine whether the angle orients the at least one object in a position to enable the capture of the visual representation of the screen.

17. The apparatus of claim 16, wherein, in determining whether the one or more inputs depict at least one object configured to capture the visual representation of the screen of the device, the processing device is further configured to:

generate one or more bounding boxes in the one or more inputs, wherein the one or more bounding boxes are formed around objects in the one or more inputs potentially configured to capture the visual representation of the screen of the device; and classify the objects in respective ones of the one or more bounding boxes;

wherein the generating and the classifying are performed using the one or more machine learning models.

18. The apparatus of claim 16, wherein, in determining whether the one or more inputs depict at least one object configured to capture the visual representation of the screen of the device, the processing device is further configured to:

determine positions of the at least one object at different times; and generate bounding boxes around the at least one object at the different times.

19. An article of manufacture comprising a non-transitory processor-readable storage medium having stored therein program code of one or more software programs, wherein the program code when executed by at least one processing device causes said at least one processing device to perform the steps of:

receiving one or more inputs captured by a camera of a device;

determining, using one or more machine learning models, whether the one or more inputs depict at least one object configured to capture a visual representation of a screen of the device;

generating a recommendation comprising at least one action to prevent the capture of the visual representation of the screen of the device responsive to an affirmative determination;

wherein, in determining whether the one or more inputs depict at least one object configured to capture the visual representation of the screen of the device, the program code further causes said at least one processing device to perform the steps of determining an angle of the at least one object with respect to the screen, and using historical data to determine whether the angle orients the at least one object in a position to enable the capture of the visual representation of the screen.

20. The article of manufacture of claim 19, wherein, in determining whether the one or more inputs depict at least one object configured to capture the visual representation of the screen of the device, the program code further causes said at least one processing device to perform the steps of:

generating one or more bounding boxes in the one or more inputs, wherein the one or more bounding boxes are formed around objects in the one or more inputs potentially configured to capture the visual representation of the screen of the device; and classifying the objects in respective ones of the one or more bounding boxes;

wherein the generating and the classifying are performed using the one or more machine learning models.

* * * * *